Dec. 11, 1951  C. H. JUDD  2,578,008
FASTENING DEVICE
Filed Dec. 19, 1945
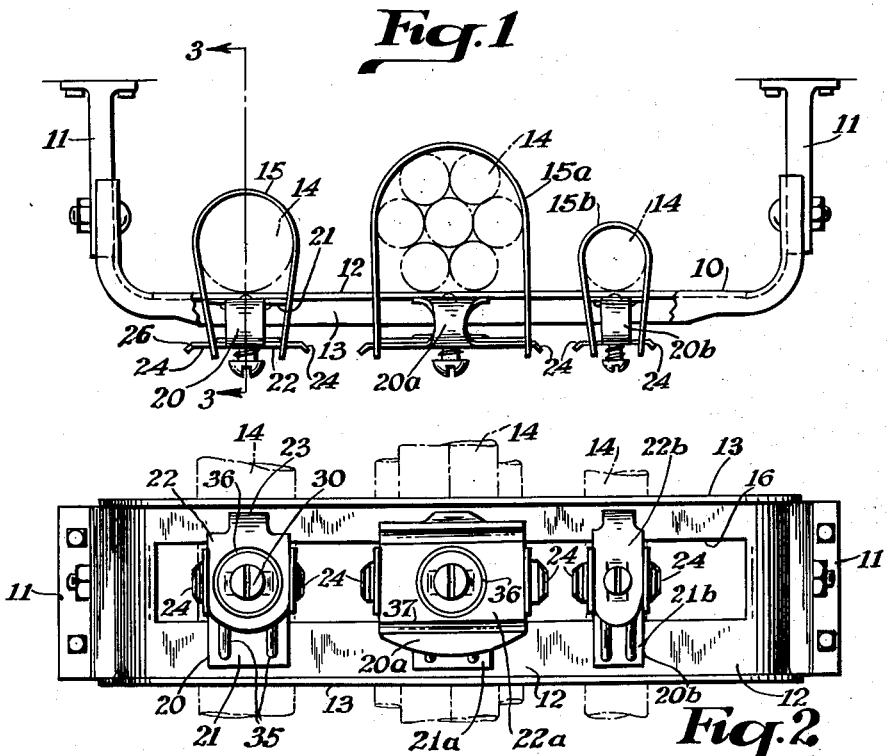
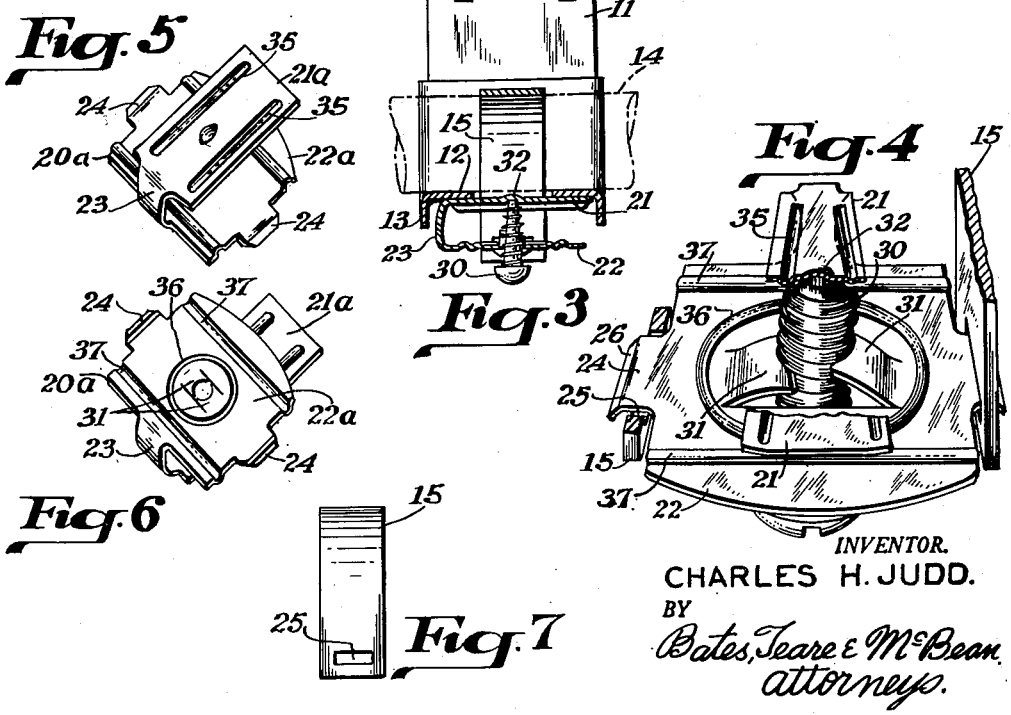
INVENTOR.
CHARLES H. JUDD.
BY
Bates, Teare & McBean
attorneys.

Patented Dec. 11, 1951　　　　　　　　　　　　　　　　　　　　　　　　　2,578,008

UNITED STATES PATENT OFFICE 2,578,008

FASTENING DEVICE

Charles H. Judd, Cleveland, Ohio, assignor to Tinnerman Products, Inc., Cleveland, Ohio, a corporation of Ohio Application December 19, 1945, Serial No. 635,983

3 Claims. (Cl. 24—243)

This invention relates to fastening devices and particularly to sheet metal devices for clamping cables, pipes and other conduits to supports, or, conversely, for clamping an article to a pipe, such as a standard.

The invention is of particular usefulness in the replacement of wiring and piping in a building or ship, for example, which has already been built. A common form of support for cable and pipe, which is at present in use, comprises a hanger in the form of a steel channel having depending flanges to provide stiffness and having a longitudinal slot in the web. The cable or pipe is laid across the web of the channel and is clamped thereto by means of a U-shaped strap, and the free ends of which project through the slot in the web and are pulled tight by some form of tensioning device.

Where articles have been clamped to pipe standards, U-shaped straps have heretofore been used in conjunction with some form of tensioning device which bears against the article and forces it against the pipe by pulling on the free ends of the strap.

Since, in the method here considered of clamping a cable or pipe to a support, the free ends of the U-shaped strap are inserted through a slot in the support, it is desirable to have a separable tensioning device which will engage the ends of the strap after their insertion, as distinguished from fastening means integral with the ends of the strap themselves. Heretofore, tensioning devices for this purpose have been subject to various disadvantages. One type of device comprised a number of pieces which individually performed the separate functions required in the operations. As is usual in such a case, much inconvenience is experienced in use of the device. Another type, although unitary in form, was so arranged that adequate strength could be secured only by the use of uneconomically stiff and heavy material.

An object of the present invention, therefore, is to provide a tensioning device for this purpose which may be economically stamped from a single piece of sheet metal and which will perform the clamping function in a satisfactory and advantageous manner.

An embodiment of the invention is illustrated in the accompanying drawings in which Fig. 1 is a side elevation of a support with the fastening device of this invention in operation thereon; Fig. 2 is a bottom plan view of the same; Fig. 3 is a transverse section taken on the line 3—3 of Fig. 1; Fig. 4 is a fragmentary perspective view, partly broken away, illustrating the interrelationship of the various elements of the device; Fig. 5 is a perspective view of the top of the device; Fig. 6 is a bottom perspective view of the same; and Fig. 7 is an end elevational view of the U-shaped strap.

While the fastening device of my invention may be used in conjunction with many types of supports, I have illustrated a specific embodiment in the drawings which is designed to cooperate with the support there shown. The support or hanger 10 comprises a steel channel carried by suitable brackets 11. To provide a horizontal support the brackets may be secured to the underside of a floor or deck, or to provide a vertical support they may be secured to a wall or bulkhead. The channel comprises a web 12 and depending flanges 13. The pipes or cables 14 which are to be supported rest upon the web 12 and are clamped thereto. The U-shaped band 15, three sizes of which are illustrated in Figs. 1 and 2 at 15, 15a and 15b is used to hold the cable or pipe firmly upon the support. A longitudinal slot 16 is formed in the web of the channel through which the free ends of the band may project, enabling the band to be drawn downwardly with respect to the support, and also preventing longitudinal shifting of the band along the cable or pipe.

All of the parts referred to in the preceding paragraph are admitted to be old, and my invention resides solely in a device by means of which the ends of the band are tensioned with respect to the cable or support. The tensioning or fastening device comprises a strip of sheet metal bent intermediately to form two arms 21 and 22 and a connection portion 23. The upper arm 21, as viewed in the drawings, is adapted to bridge the slot in the web of the channel and to have a substantial area of contact with the material at either side of the slot. The lower arm 22 is provided with lateral extensions 24 adapted to be projected through openings 25 in the ends of the band. The ends of the extensions are preferably bent as at 26 in a downward direction, resulting in hook formations for the better retention of the band ends.

The transverse dimension of the arm 22 is preferably substantially the same as the diameter of the article to be clamped, so that the arms of the band may be pulled substantially vertically. Thus, for the usual small diameters of cables and pipes, the fastener may be so designed that its two arms are of the same width, for economy in manufacture. This relationship is illustrated by the fasteners 20 and 20b (Figs. 1 and 2). For the clamping of larger cables or other articles the fastener may be designed as illustrated at 20a, the lower arm 22a being extended, commensurate with the size of the article, to a width substantially greater than that of the upper arm 21a. It will be understood that the upper arm need be only wide enough to provide a firm bridge across the slot.

In the application of the fastener, relative movement of the arms is contemplated, necessitating a bending action at the connecting portion 23. To localize this bending action and thus preserve the flatness of the arms, I prefer to reduce the width of the connecting portion below that of either arm, as illustrated in the drawings, thus reducing its stiffness.

The device is intended to bear against the lower face of the web and to pull downwardly upon the band by a forcible separation of the two arms. The separation is accomplished by means of a screw 30 which threadingly engages the lower arm and bears against the upper arm. By the turning of the screw in the proper direction the lower arm 22 is forced downwardly, and, because of its engagement with the ends of the band, the latter is clamped tightly upon the article. I find it convenient and preferable to provide the thread-engaging means in the form of a sheet metal nut. To this end, an aperture is formed centrally of the lower arm and the material at either side of the opening is struck from the plane of the arm to provide tongues 31, the ends of which engage the thread of the screw. Such formation provides its own locking action inasmuch as the tongues are strained toward their original position in the plane of the arm when the device is in operation. This results in the mutual approach of the ends of the tongues, and, therefore, in a secure clamping action upon the screw. I secure this result by striking the tongues upwardly, that is, in a direction toward the other arm.

A depression 32 is preferably made in the upper arm, in registration with the aperture of the lower arm, to provide a locating socket for the end of the screw. This results in a positive action of the fastener as the screw is at all times maintained in a vertical position, without needing to be secured to the upper arm in any more positive and costly manner.

Substantial strains are set up in the arms due to the localized points of pressure. This would normally indicate the use of a heavy gauge of metal, but I have found that a thinner and more economical stock may be utilized by the provision of appropriately placed stiffening ribs. The screw 30 bears against a point of the upper arm substantially in the center of the unsupported region thereof. Longitudinal ribs 35 are provided, therefore, in this arm which bridge the gap and result in adequate stiffness to prevent bending. I find that the lower arm in the narrower form of fastener, as illustrated at 22b, possesses sufficient inherent stiffness in a transverse direction. Where the width of the arm is increased, however, as at 22 and 22a, I have found that a circular rib, as at 36, surrounding the aperture and the spring tongues effectively prevents deformation of the arm. In the case of an extended width, as illustrated at 22a, additional stiffness may be provided by transverse ribs 37.

Briefly, the operation of the device is as follows: The pipe or cable to be clamped is placed across the support and an appropriately sized U-shaped strap is placed thereover with its ends projecting downwardly through the slot in the support. A fastening device, of an appropriate size, embodying my invention is then placed against the lower surface of the web and the ends of the strap are sprung over the lateral extensions of the lower arm. In the normal, unstressed condition of the device the spacing between the arms is small enough to allow the device to be easily inserted into position. By the simple application of a screw driver the screw may then be turned and the spacing of the arms increased. Since the upper arm bears against the support and the lower arm is in engagement with the strap, the upper region of the strap is, by this operation, drawn toward the support and firmly clamps the pipe or cable to it. The parts are all placed in a tensioned condition by this operation and the screw is firmly locked against inadvertent rotation. Thus, it will be apparent that by means of my fastening device the clamping of the article to the support may be accomplished with rapidity and ease and that, since it is a unitary device, no complications are encountered due to a multiplicity of parts.

While I have illustrated a specific embodiment of my fastening device, numerous changes may be made within the spirit and scope of the invention.

I claim:

1. A fastening device comprising a resilient strip bent intermediately to provide two arms extending in the same general direction, an aperture in one arm, thread engagement means integral with the said one arm adjacent the aperture and extending toward the other arm, and lateral extensions projecting from opposite edges of the said one arm having end portions projecting out of the plane thereof away from the other arm for hooking engagement with an article to be moved relative to the other arm, by a screw extending through the aperture and engaging said means and the said other arm.

2. A fastening device for a U-shaped loop adapted to embrace an article to be clamped, said device comprising a sheet metal strip bent intermediately to provide two arms extending in the same general direction, an aperture in one arm, thread engagement means on said one arm adjacent the aperture therein, lateral extensions projecting from the opposite edges of said one arm and formed for engagement with the arms of the loop, and a screw extending through the aperture and threaded in said thread engagement means and engaging said other arm.

3. A fastening device comprising a strip bent intermediately to provide two arms extending in the same general direction and connected by a resilient return bend, an aperture in one arm, thread-engaging means integral with said one arm adjacent the aperture, lateral extensions projecting in opposite directions from opposite edges of said one arm, and a screw extending through said aperture in threaded engagement with the thread-engaging means and of a length sufficient to have its point engage the other arm.

CHARLES H. JUDD.

REFERENCES CITED

The following references are of record in the file of this patent:

UNITED STATES PATENTS

| Number | Name | Date |
|---|---|---|
| 573,317 | Younger | Dec. 15, 1896 |
| 1,694,664 | Parker | Dec. 11, 1928 |
| 1,920,899 | Sullivan | Aug. 1, 1933 |
| 2,135,417 | Tinnerman | Nov. 1, 1938 |
| 2,173,544 | Tinnerman | Sept. 19, 1939 |

FOREIGN PATENTS

| Number | Country | Date |
|---|---|---|
| 198,193 | Great Britain | May 31, 1923 |
| 417,715 | Germany | Aug. 25, 1925 |